(12) United States Patent
Putnam

(10) Patent No.: US 6,252,996 B1
(45) Date of Patent: *Jun. 26, 2001

(54) SYSTEMS AND METHODS FOR IMAGE CONVERSION USEFUL IN THE TRANSFORMATION OF PHOTOGRAPHIC PICTURES INTO TEMPLATES FOR PAINTING

(75) Inventor: Leland Kent Putnam, Murray, UT (US)

(73) Assignee: Number Art LLC

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/203,004

(22) Filed: Dec. 1, 1998

(51) Int. Cl.[7] ........................................ G06K 9/42

(52) U.S. Cl. ................................... 382/259; 382/276

(58) Field of Search ........................ 382/308, 277, 382/259, 180, 169, 237, 270, 271, 272, 273, 197, 276; 358/456, 466; 345/431, 438

(56) References Cited

U.S. PATENT DOCUMENTS

| | | | |
|---|---|---|---|
| 5,499,322 | * 3/1996 | Thirion et al. | 395/118 |
| 5,546,107 | * 8/1996 | Deretsky et al. | 395/600 |
| 5,748,197 | * 5/1998 | Guibas et al. | 345/438 |
| 5,809,179 | * 9/1998 | Marimont et al. | 382/254 |
| 5,835,099 | * 11/1998 | Marimont | 345/431 |

* cited by examiner

Primary Examiner—Yon J. Couso
(74) Attorney, Agent, or Firm—Kirton & McConkie; Michael F. Krieger

(57) ABSTRACT

Methods and computer executable instructions are provided for converting original images such as photographic pictures into various other formats such as drawings by reducing the amount of data contained in the original images. It is a feature of this invention that a photographic picture can be converted into a drawing useful as a template to enable a person to paint the template into a likeness of the photographic picture. In a preferred embodiment, an original image is supplied to a computing environment where it is quantized into pixels of information. Each scalar value of each pixel is evaluated and aberrant pixels are absorbed into adjacent pixels by converting various scalar values. Thereafter, pixels having similar scalar values are grouped into regions. The boundaries between the regions are absorbed into each of the surrounding regions to provide a smoothed boundary. The regions then provide a template conducive to painting.

21 Claims, 5 Drawing Sheets

SYSTEMS AND METHODS FOR IMAGE CONVERSION USEFUL IN THE TRANSFORMATION OF PHOTOGRAPHIC PICTURES INTO TEMPLATES FOR PAINTING

BACKGROUND OF THE INVENTION

1. The Field of the Invention

The present invention relates generally to reducing the amount of data used to represent information. More specifically the present invention relates to systems and methods for converting original images such as photographic pictures into various other formats such as drawings by reducing the amount of data contained in the original images. Even more specifically, the present invention teaches the conversion of photographic pictures into representations thereof to enable a person to paint a likeness of the photographic picture.

2. The Relevant Technology

It is becoming increasingly more important to be able to accurately represent information with smaller representations. For example, when transmitting data via a modem across a communications network, gains in bandwidth and speed up to 400 percent can be realized by compressing the data before transmission. Yet, with data compression it is imperative that upon receipt of the data, at the reception end of the network, that the data be accurately recovered by decompression.

However, one problem is that not all smaller representations of information require such accuracy. Hence, lossy compression schemes have been developed to transmit video and pictures across communication networks. But lossy compression still requires a corresponding decompression vehicle to obtain the limited representation of the original. This increases complexity.

Another problem is that not every smaller representation of information is required to be transmitted over a communication network. As such, compression/decompression techniques are inadequate for providing reduced representations of information when information is not transmitted nor when accuracy is not critical. Also, compression and decompression schemes usually involve relatively expensive and complex hardware and/or software components.

Alternatively, since (de)compression exploits redundancies in data to achieve gains, another problem exists because not all representations of information are readily given to exploiting redundant information. For example, sometimes with photos, colors range so widely that actual redundancy is rare. Accordingly, it would be an advance to be able to create reduced representations of information in a manner independent of data redundancies and (de)compression schemes.

Reduced representations of information are useful in many facets of life. For example, for reducing the size of information when communicating over a network as previously indicated. Reduced representations of information are also desirous when storing information because less storage space often translates into increased savings in computing storage medium, shortened time of retrieval from storage and others.

Image conversion is also closely related to reduced representations of information because the original information that is reduced is typically converted into another format during intermediacy or as a final format. As an example, the famous painting of the Mona Lisa is often used in advertising literature as a picture in magazines. Thus, a painting is converted into a picture. The picture, however, is less descriptive in detail than the original painting in that it lacks brush stokes, detail, etc. Consequently, motivation exists to combine image conversion with reduced representations of information.

Similarly, a market need presently exists for converting images such as photographic pictures into drawings. The drawings, useful as templates, then enable people to recreate a likeness of the photo by painting the drawings into a version of their favorite picture. Some drawing templates are even formatted in a "paint-by-number" format. Drawings as painting templates, however, inherently cannot contain as much detail as the original photo because if boundary lines existed in the drawings in correspondence to every minute detail in a photograph, extreme clutter in the painting would result and the likeness trying to be recreated by "painting the photo" would be severely distorted.

As such, it is desirous to convert original images into other formats while providing for reductions in the representation of information contained in the original images in a manner that is independent of data redundancies and (de)compression schemes.

OBJECTS AND SUMMARY OF THE INVENTION

It is, therefore, an object of the present invention to provide improved systems and methods for image conversion.

It is a further object of the present invention to provide systems and methods for producing reduced representations of information in a manner independent of data redundancies and (de)compression schemes.

It is a another object of the present invention to provide systems and methods that combine image conversion with the production of reduced representations of information.

It is still another object of the present invention to provide systems and methods for converting original images into various other formats.

It is yet another object of the present invention to provide systems and methods for converting photographic pictures into drawings.

It is still yet another object of the present invention to provide systems and methods for converting photographic pictures into drawing templates to enable people to paint a likeness of the photographic picture.

It is an even further object of the present invention to provide economically inexpensive systems and methods for converting photographic pictures into drawing templates.

It is yet a further object of the present invention to provide computer readable medium having computer executable instructions for converting images and producing reduced representations of information.

In accordance with the invention as embodied and broadly described herein, the foregoing and other objectives are achieved by providing methods and computer executable instructions for converting original images such as photographic pictures into various other formats such as drawings by reducing the amount of data contained in the original images. It is a feature of this invention that a photographic picture can be converted into a drawing that is useful as a template to enable a person to paint the drawing into a likeness of the photographic picture.

In a preferred embodiment, an original image is supplied to a computing environment where it is quantized into pixels of information having scalar values associated therewith.

Each scalar value of each pixel is evaluated and aberrant pixels are absorbed into adjacent pixels by converting scalar values.

Thereafter, pixels having similar scalar values are grouped into regions. The boundaries between the regions are absorbed into each of the surrounding regions to provide a template conducive for painting. Reference indicia are optionally applied to facilitate correspondence between the original (picture) and converted (template) images.

These and other objects and features of the present invention will become more fully apparent from the following description and appended claims, or may be learned by the practice of the invention as set forth hereinafter.

BRIEF DESCRIPTION OF THE DRAWINGS

In order to more fully understand the manner in which the above-recited and other advantages and objects of the invention are obtained, a more particular description of the invention will be rendered by reference to specific embodiments thereof which are illustrated in the appended drawings. Understanding that these drawings depict only typical embodiments of the invention and are not therefore to be considered to be limiting of its scope, the invention in its presently understood best mode for making and using the same will be described and explained with additional specificity and detail through the use of the accompanying drawings in which.

DETAILED DESCRIPTION OF THE PREFERRED EMBODIMENTS

Figure 1:
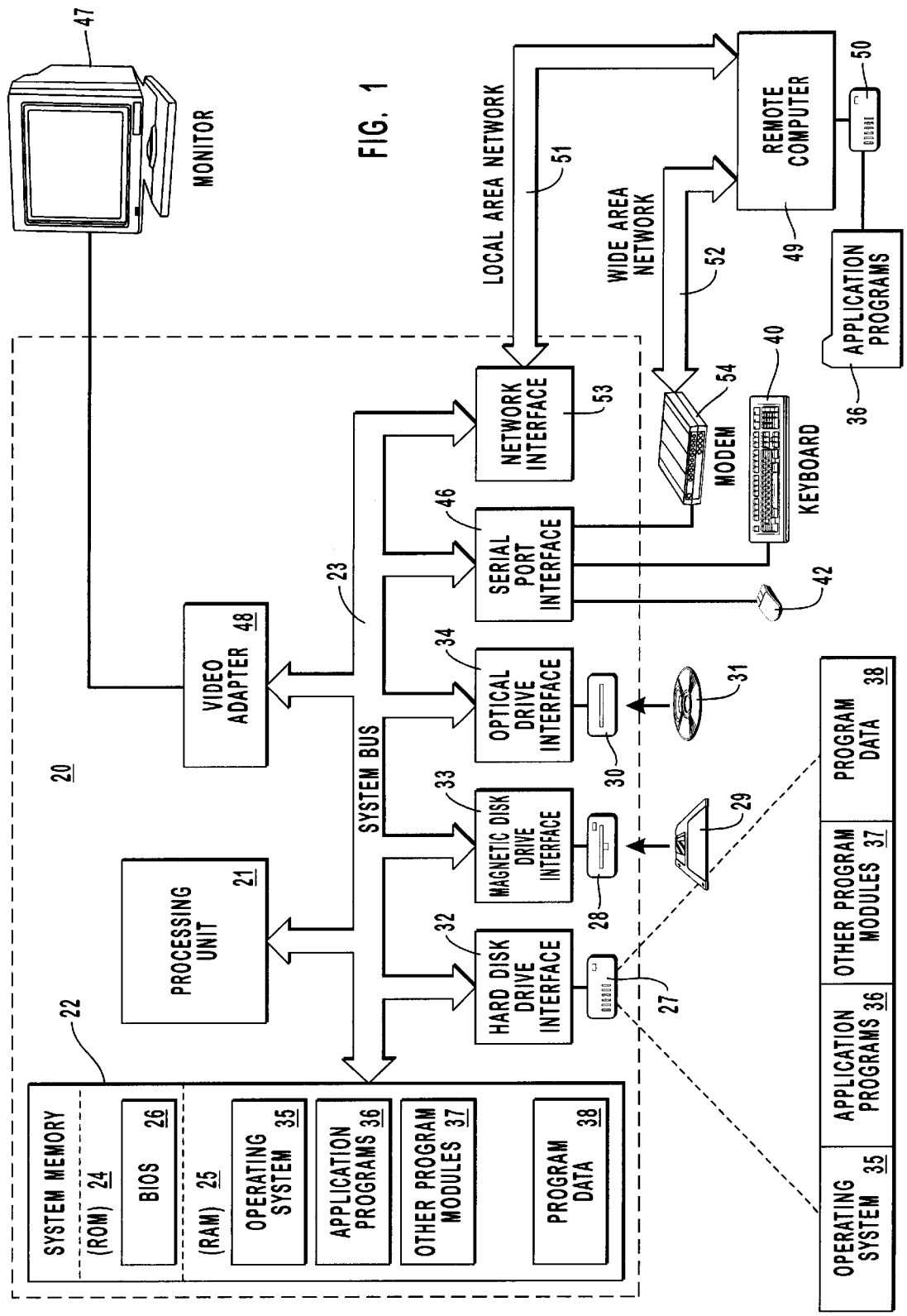
FIG. 1 is an exemplary system providing a suitable operating environment for the present invention.

The present invention relates to methods and computer executable instructions for converting original images such as photographic pictures into various other formats such as drawings by reducing the amount of data contained in the original images. It is a feature of this invention to convert a photographic picture into a drawing useful as a template to enable a person to paint the drawing into a likeness of the photographic picture.

In accordance with the present invention, diagrams are used herein to illustrate either the structure or processing of embodiments used to implement the system and method of the present invention. Using the diagrams in this manner to present the invention, however, should not be construed as limiting of its scope but merely as representative.

FIG. 1 and the following discussion are intended to provide a brief, general description of a suitable computing environment in which either the structure or processing of embodiments may be implemented. Since the following may be computer implemented, particular embodiments may range from computer executable instructions as part of computer readable media to hardware used in any or all of the following depicted structures. Implementation may additionally be combinations of hardware and computer executable instructions.

When described in the context of computer readable media having computer executable instructions stored thereon, it is denoted that the instructions include program modules, routines, programs, objects, components, data structures, etc. that perform particular tasks or implement particular abstract data types upon or within various structures of the computing environment. Executable instructions exemplarily comprise instructions and data which cause a general purpose computer, special purpose computer, or special purpose processing device to perform a certain finction or group of functions.

The computer readable media can be any available media which can be accessed by a general purpose or special purpose computer. By way of example, and not limitation, such computer readable media can comprise RAM, ROM, EEPROM, CD-ROM or other optical disk storage, magnetic disk storage or other magnetic disk storage devices, or any other medium which can be used to store the desired executable instructions or data fields and which can be accessed by a general purpose or special purpose computer. Combinations of the above should also be included within the scope of computer readable media For brevity, computer readable media having computer executable instructions may sometimes be referred to as "software" or "computer software."

With reference to FIG. 1, an exemplary system for implementing the invention includes a general purpose computing device in the form of a conventional computer 20. The computer 20 includes a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the computer 20, such as during start-up, may be stored in ROM 24. The computer 20 may also include a magnetic hard disk drive 27 for reading from and writing to a hard disk, not shown, a magnetic disk drive 28 for reading from or writing to a removable magnetic disk 29, and an optical disk drive 30 for reading from or writing to removable optical disk 31 such as a CD-ROM or other optical media. The hard disk drive 27, magnetic disk drive 28, and optical disk drive 30 are connected to the system bus 23 by a hard disk drive interface 32, a magnetic disk drive-interface 33, and an optical drive interface 34, respectively. The drives and their associated computer-readable media provide nonvolatile storage of computer readable instructions, data structures, program modules and other data for the computer 20.

Although the exemplary environment described herein employs a hard disk, a removable magnetic disk 29 and a removable optical disk 31, it should be appreciated by those skilled in the art that other types of computer readable media which can store data accessible by a computer include magnetic cassettes, flash memory cards, digital video disks, removable disks, Bernoulli cartridges, random access memories (RAMs), read only memories (ROM), and the like.

Other storage devices are also contemplated as available to the exemplary computing system. Such storage devices may comprise any number or type of storage media including, but not limited to, high-end, high-throughput magnetic disks, one or more normal disks, optical disks, jukeboxes of optical disks, tape silos, and/or collections of tapes or other storage devices that are stored off-line. In general, however, the various storage devices may be partitioned into two basic categories. The first category is local storage which contains information that is locally available to the computer system. The second category is remote storage which includes any type of storage device that contains information that is not locally available to a computer system. While the line between these two categories of devices may not be well defined, in general, local storage has a relatively quick access time and is used to store frequently accessed data, while remote storage has a much longer access time and is used to store data that is accessed less frequently. The capacity of remote storage is also typically an order of magnitude larger than the capacity of local storage.

A number of program modules may be stored on the hard disk, magnetic disk 29, optical disk 31, ROM 24 or RAM 25, including an operating system 35, one or more application programs 36, other program modules 37, and program data 38. A user may enter commands and information into the computer 20 through input devices such as a keyboard 40 and pointing device 42. Other input devices (not shown) may include a microphone, joy stick, game pad, satellite dish, scanner, or the like. These and other input devices are often connected to the processing unit 21 through a serial port interface 46 that is coupled to system bus 23, but may be connected by other interfaces, such as a parallel port, game port or a universal serial bus (USB). A monitor 47 or other type of display device is also connected to system bus 23 via an interface, such as video adapter 48. In addition to the monitor, computers often include other peripheral output devices (not shown), such as speakers and printers. Scanner peripheral devices (not shown) for reading imagery into the computer are often also included.

The computer 20 may operate in a networked environment using logical connections to one or more other computing configurations, such as remote computer 49. Remote computer 49 may be a personal computer, a server, a router, a network PC, a peer device or other common network node, and typically includes many or all of the elements described above relative to the computer 20, although only a memory storage device 50 has been illustrated in FIG. 1. The logical connections depicted in FIG. 1 between the computer 20 and the remote computer 49 include a local area network (LAN) 51 and a wide area network (WAN) 52 that are presented here by way of example and not limitation. Such network environments are commonplace in offices and work spaces which enterprise-wide computer networks, intranets and the Internet.

When used in a LAN networking environment, the computer 20 is connected to the local network 51 through a network interface or adapter 53. When used in a WAN networking environment, the computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the computer 20, or portions thereof, may be stored in the local or remote memory storage devices and may be linked to various processing devices for performing certain tasks. It will be appreciated that the network connections shown are exemplary and other means of establishing a communications link between the computers may be used.

Moreover, those skilled in the art will appreciate that the invention may be practiced with other computer system configurations, including hand-held devices, multi-processor systems, microprocessor-based or programmable consumer electronics, network PCs, minicomputers, computer clusters, mainframe computers, and the like.

Figure 2A:
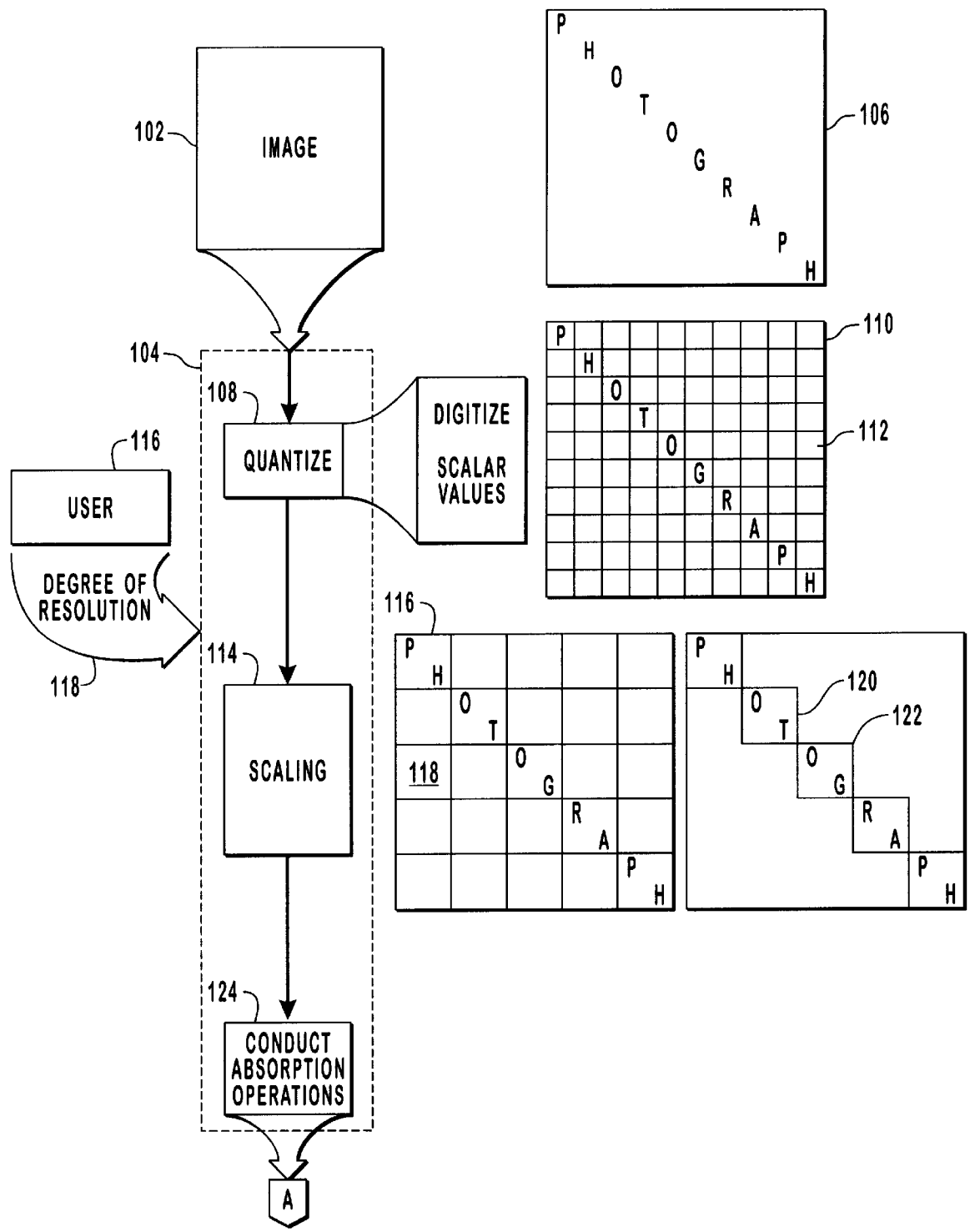
FIG. 2A is a first portion of a diagram of an exemplary hierarchical operation for performing image conversion in accordance with the present invention.
Figure 2B:
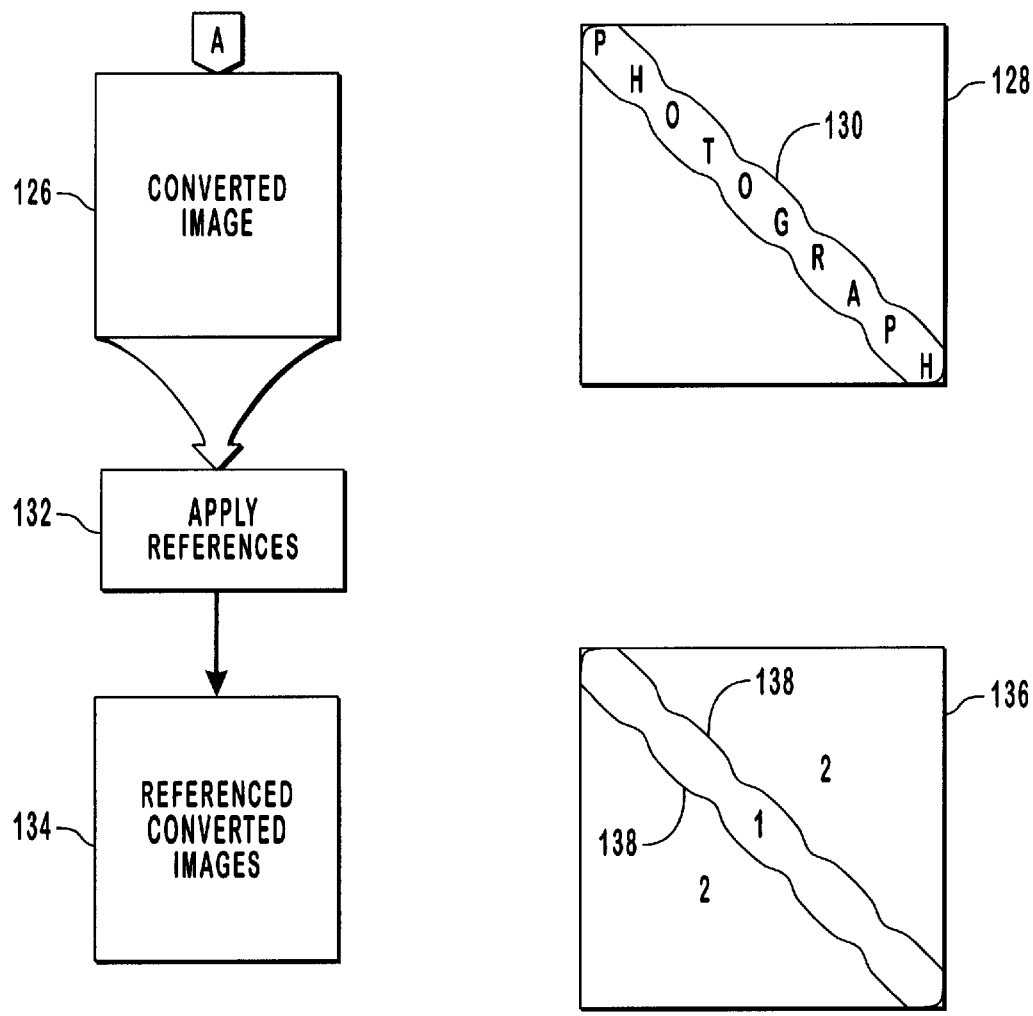
FIG. 2B is a second portion of a diagram of the exemplary hierarchical operation for performing image conversion in accordance with the present invention.

A diagram of an exemplary hierarchical operation for performing image conversion in accordance with the present invention is depicted generally in FIGS. 2A and 2B. At 102, an original image is supplied to an operating environment 104 (indicated by the dashed box) such as the one described in relation to FIG. 1. As used herein, original image refers generally to a representation of an object(s) such as that captured in a photographic or non-photographic picture, a drawing, a sketch, a painting, a print, etc. An original image may ii also be a copy, derivation, representation, etc. of another image but is referred to as "original" because it is the version that is originally being supplied to the operating environment 104. For brevity, original image may be referred to as image.

Throughout this figure, generally on the right-hand side thereof, are a plurality of exemplary illustrations paralleling the various box descriptors to facilitate the description of the image conversion of the present invention. For example, paralleling the "image" box descriptor 102 is a photographic picture illustrated as photograph 106. As described is subsequently, a quantized photograph 110 parallels the "quantize" box descriptor 108 and so on. The use of a photograph to represent image conversion, however, is merely representative and should not be construed as restrictive. The photograph could additionally be any other image such as those previously described.

Once supplied to the operating environment 104, the image is quantized 108 into a plurality of measurable increments to facilitate conversion of the image in a manner particularly suited to a computing environment. Preferably, the image is supplied to the operating environment via a scanner device well known in the art to facilitate the quantization thereof. Even more preferably, the quantized image is divided into measurable increments well known as pixels of information. In this manner, the computer environment is able to work with discrete digital values of information representative of the image supplied at 102. Representing this quantization of the image is the photograph 110 having a plurality of measurable increments 112 cordoning off each letter in the word P-H-O-T-O-G-R-A-P-H into a representation of pixels of information.

Further comprising the quantization of the image at 108 is the evaluation or determination of a scalar value for each of the measurable increments. In working with black and white photographs, this preferably includes the determination of a gray scale value for each of the pixels of information 112. Determinations of gray scale are well known and exemplary include determinations such as defining the "light" level of a pixel of information or defining the brightness required to produce a specified density change on film. Determining a scalar value, however, may additionally include other known means. For example, in working with color photographs, this preferably includes determining a vector value related to the color of the pixels of information 112. Still other scalar values are intimated. Again, by quantizing in this manner, i.e., by determining scalar values, the operating environment is better able to manipulate and process these measurable increments.

Scaling of the image at 114 is optionally performed within the operating environment as either a function of user input or as an adjustment initiated within the operating environment. Scaling, as the name implies, transforms the image into a size representation different than when the image is supplied to the operating environment at 102. In this manner, image conversion can be sped up because less conversion is required by the operating environment when the image is represented with little detail in a large scale format. For various reasons, however, scaling may also adjust the image into a smaller scale format.

In the context of scaling as a function of user input, a user 116 supplies to the operating environment a degree of resolution 118 in order to scale the image 102 into a desired size. The desired size may be a reiterative process performed between the user and the operating environment via multiple selections of input supplied by the user. Preferred degree of resolution inputs include, but are not limited to, the number of colors desired to represent the converted image, the desired physical size of the converted image, the preferred item to be highlighted in the converted image and any other similar such inputs influencing the degree of resolution.

In the context of scaling initiated within the operating environment, the operating environment may, upon its discretion, scale the image into a desired scale size in order to simplify the calculations used in the process of converting an image. Whether initiated within the operating environment or supplied via a user, it will be appreciated that scaling may be performed after quantizing as illustrated or, alternatively, before quantizing. The particular order of when scaling occurs is flexible.

Representing this scaling of the image is photograph 116. Photograph 116 has a plurality of measurable increments 118 that cordon off two letters per representation of each pixel of information such that the diagonal measurable increments are now grouped as follows: PH-OT-OG-RA-PH. In a comparison between photographs 110 and 116, the pixels of information (measurable increments 118) represent a 2×2 matrix of pixels of information (measurable increments 112).

For the purposes of illustrating the remaining hierarchical operation of image conversion, it will be appreciated that the diagonal pixels of information containing the word PH-OT-OG-RA-PH are pixels of information having similar scalar values and have been grouped together into a region 120. This region of similar scalar values is distinguished from other regions having dissimilar scalar values because, when painting a likeness of a picture, similar scalar values are indicative of similar color regions in the photograph and need to be identified to a user so that the user can paint these regions to accurately reproduce the picture. For the purposes of illustration, it is important to notice that these pixels of information in region 120 have very abrupt changes in direction every time a corner 122 of a pixel of information is encountered. It is to these abrupt changes, among other things, that the conduction of absorption operations at 124 is performed. These absorption operations will be described subsequently in detail. For now, these operations are represented by the photograph 128 having a "smoothed" diagonal representation of pixels of information 130. Photograph 128 corresponds to the converted image 126 supplied by the operating environment 104.

As used herein, the converted image 126 refers to the original image changed in form or format for the purposes of enabling a usage that is not particularly suited to the form or format of the original image. Preferably, this includes changing a photographic picture into a drawing useful as a template for painting a likeness of the photographic picture.

To facilitate correspondence between the original image 102 and the converted image 126, reference indicia may be optionally applied to the converted image at 132 to form a referenced converted image at 134. Representing this referenced converted image at 134 is a drawing 136 having boundaries 138 with reference indicia (numerals 1 or 2). In this manner, when a photographic picture is supplied to the operating environment 104 for the purposes of creating a drawing useful as a template for painting a likeness of the photographic picture, boundaries 138 having reference indicia (represented by numerals 1 or 2) are created to cordon off various portions of the drawing for the purposes of enabling painting of the boundaries with various corresponding colors of paint. Ultimately, this provides a means whereby a user can experience the joys of painting a likeness or representation of their favorite pictures.

Figure 3:
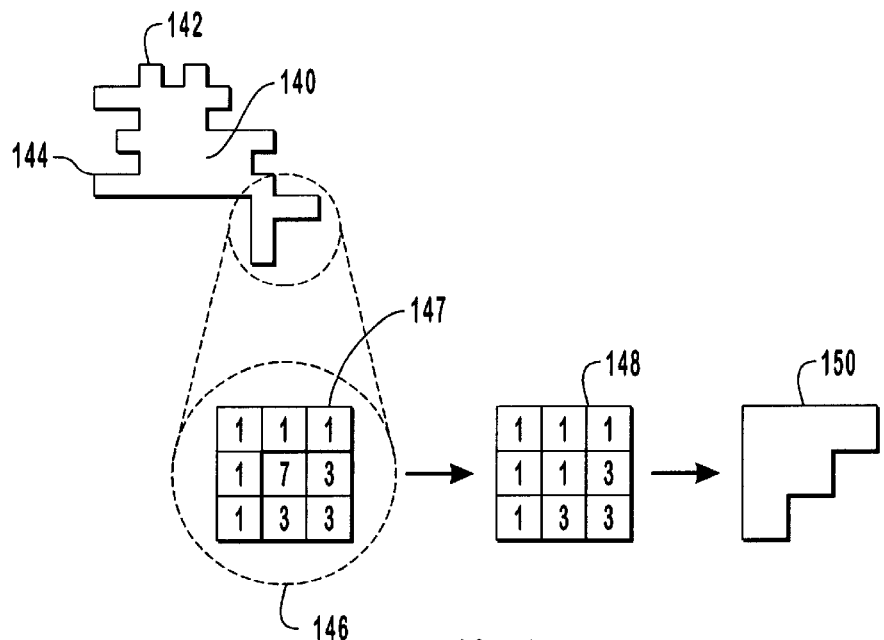
FIG. 3 is a diagram of a pixel of information absorbed into neighboring pixels of information.

The remaining figures will be used to particularly describe how the preferred absorption operation are conducted within the scope of this invention. With reference to FIG. 3, for the reasons described previously, a plurality of adjacent pixels of information having similar scalar values are grouped together into a region 140. Region 140, unlike the previously described region of diagonal pixels of information, is more indicative of how adjacent pixels of information having similar scalar values would actually look in the context of this invention. Like the previous region, however, region 140 has a boundary 142 that is very irregular in shape with abrupt changes particularly occurring at corners 144.

A portion of region 140 has been enlarged within circle 146 to particularly illustrate one of the preferred absorption operations. In this example, the portion of region 140 within the circle 146 are the individual pixels of information having the scalar value of "1" along the top and left portions of matrix 147. Four additional pixels of information adjacently disposed in a 2×2 arrangement in the bottom right-hand corner of matrix 147 are also included within circle 146 and have scalar values of either a "7" or a "3." These other pixels of information are not within the region 140 but are the pixels of information neighboring the region 140.

Through various methods of scanning through the pixels of information of the entire quantized image, the scalar value of "7" can readily be identified by the operating environment as an aberrant value between a plurality of 1's and 3's. It will be appreciated that since the scalar value of "7" is representative of one pixel of information, the "7" represents about ½0th of an inch by about ½0th of an inch of information, or some scaled value as initiated as a function of user input or within the operating environment as previously described. Thus, this scalar value represents an extremely tiny parcel of information that has little applicability in reproducing an original image with a converted image for the purposes of painting. It is for this reason that the original image can be represented with a reduced representation of information and the aberrant scalar value can be absorbed into its surrounding environment. If this is not done, the converted image will appear cluttered and may introduce distortion when formatted into a drawing usefull as a template for painting-by-numbers.

One preferred method for absorbing the scalar value "7" into its surrounding environment, i.e., the neighboring pixels of information, is by first determining that the scalar value of "1" represents the "dominant" or "heaviest" surrounding environment about the "7." Then, converting the "7" into a "1" as indicated by the center pixel of information in matrix 148. Thereafter, the portion of region 140 having scalar values of "1" now becomes the shape indicated at 150 vice the shape of the top and left portion of matrix 147.

Another preferred method for absorbing the scalar value "7" into its surrounding environment is by determining that the scalar value of "3" is "closest in color," for example, to the "7" than is the color represented by the "1." The "7" would then be converted into a scalar value of "3." The shape of this absorbed region is readily intimated from the foregoing description.

Still another preferred method for absorbing the scalar value of "7" into its surrounding environment is by performing a "spatial analysis" of the boundaries that converting the "7" will cause. In this manner, a smoother or more abrupt boundary region may be formed as desired.

Figure 4:
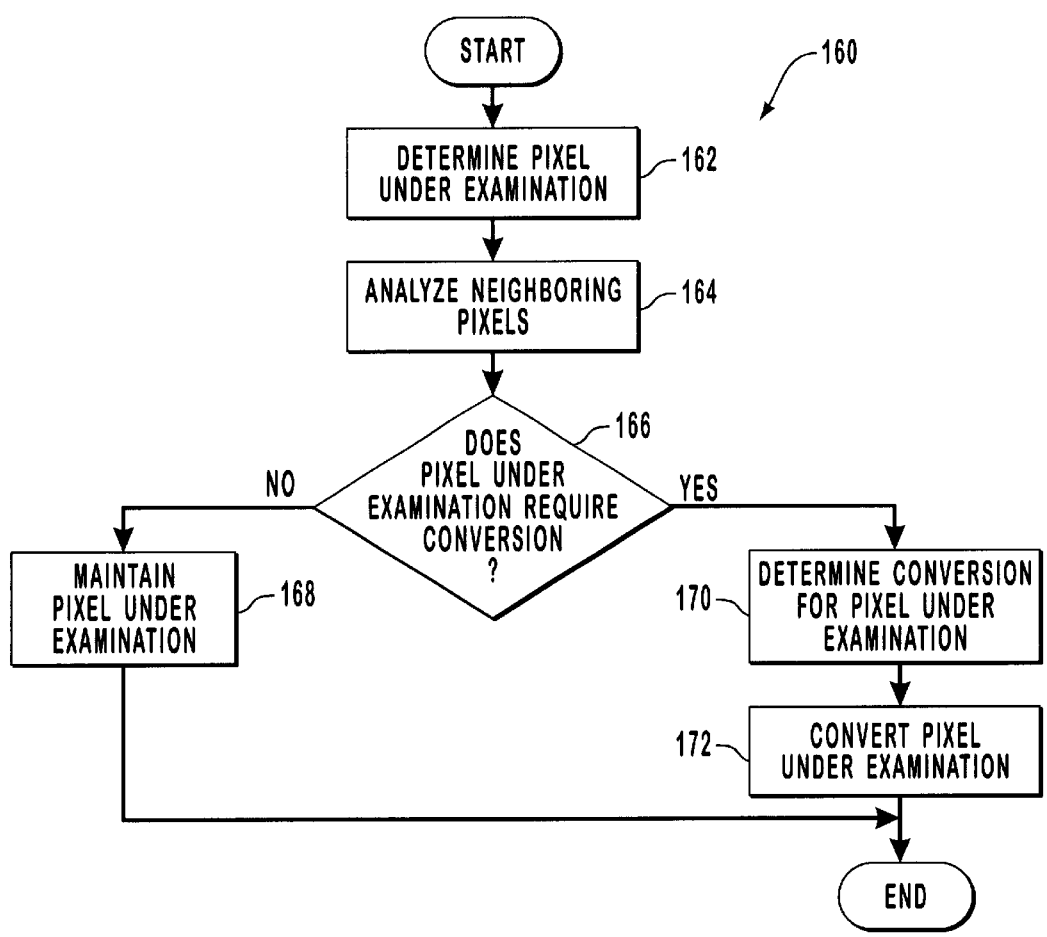
FIG. 4 is a flow diagram for conducting absorption operations as illustrated in FIG. 3.

With reference to FIG. 4, a flow diagram corresponding to the conversion of the scalar value from a "7" to a "1" is depicted generally as 160. At step 162 a determination is made regarding which pixel is under examination. In this example, the pixel under examination is the pixel of information having the scalar value of "7." As before, various mechanisms are available for determining the pixel under examination. Some preferred mechanisms include scanning the pixels of information in a horizontal, vertical, or a combinatory pattern and whenever a pixel of information is different from an adjacent pixel, performing a mini-search relative to that pixel until the pixel under examination is isolated. It will be appreciated that this is a location where scaling the image (FIG. 2A) could play an important role. For example, an image having a large scale can be more quickly analyzed than one with a smaller scale. Various other mechanisms for determining the pixel under examination also exist yet are not prescribed by this invention.

At step 164 pixels of information neighboring or adjacent to the pixel under examination are analyzed to determine whether in fact the pixel under examination requires conversion. For example, suppose the scalar value "7" in FIG. 3 was actually a "3" scalar value. In this instance, the "1" scalar values could be grouped into a region and so could the "3" scalar values without requiring an absorption operation.

Thus, at step 166 a determination is made whether the pixel under examination requires conversion. If the pixel under examination does not require conversion, such as in the foregoing example when the scalar value of "7" is a "3," then the pixel under examination is maintained as it presently exists at step 168.

If the pixel under examination does require conversion, as when the scalar value is a "7," then at step 170 a conversion value for the pixel under examination is determined. As previously described, some methods for determining the conversion value is by: (i) selecting the scalar value of the most heavily weighted scalar values adjacent or surrounding the pixel under examination; (ii) selecting the scalar value of that closest in color to the pixel under examination; and/or (iii) performing a spatial analysis as a function of boundary regions.

Thereafter, at step 172 the scalar value of the pixel under examination is converted into the scalar value corresponding to the conversion value determined at step 170. It will be appreciated that many other conversion values may be determined other than by selection of the foregoing. For example, it may be that the surrounding scalar values are all equally weighted. In this event, a predetermined or default conversion may be implemented. Perhaps an examination of previously determined conversion values may indicate the best conversion value for the present pixel under examination. Other conversion schemes are intimated by this teaching and are also fully considered within the scope of this invention.

Figure 5:
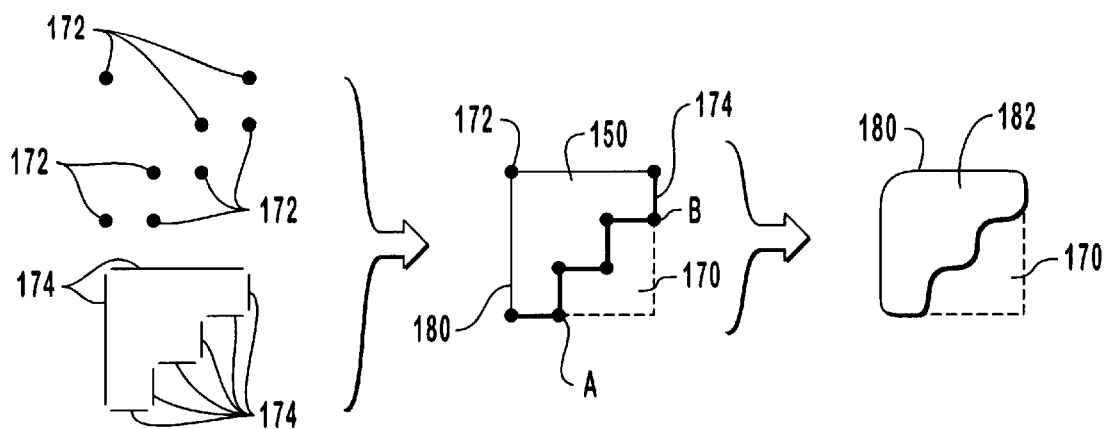
FIG. 5 is a diagram representing a plurality of regions of pixels of information having a boundary absorbed therebetween.

Another preferred absorption operation will be described with reference to FIG. 5. In this figure, the shape of the region at 150 represents those pixels of information having scalar values of "1" from FIG. 3. Likewise, the shape of the region representative of pixels of information having scalar values of "3" from matrix 148 in FIG. 3 is illustrated by dashed lines as 170.

Comprising the shape of the region 150 is a boundary 180 having a plurality of vertex points 172 that form termination points for a line or chain 174. Although not illustrated, the boundary of the shape of region 170 is also formed by a plurality of vertex points and chains some of which are commonly shared with the shape of region 150 between vertex points A and B.

It should be appreciated that since these regions are ultimately used as a template to guide a user through the painting thereof, that painting the shapes of regions 150 and 170 would be difficult and the final representation in the painting would be "unnatural." As a result, the boundaries between adjacent regions needs to be absorbed into each region in a more "natural" manner that is conducive to painting.

Thus, the boundary 180 for region 150 is "smoothed" into the shape indicated as 182. In a like manner, all boundaries about regions having similar scalar values are smoothed for the entire picture to ultimately create a converted image having smoothed boundaries conducive to painting.

Figure 6:
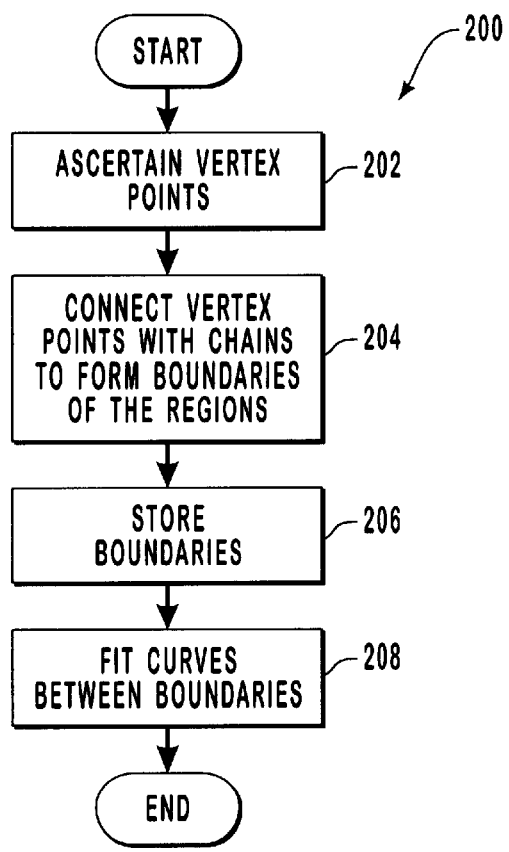
FIG. 6 is a flow diagram for conducting absorption operations as illustrated in FIG. 5.

With reference to FIG. 6, a flow diagram corresponding to the smoothing of the boundary between adjacent regions is depicted generally as 200. At step 202, the vertex points of the region are ascerted. At step 204, the vertex points are connected with chains to form the boundaries of the regions. The exact methodology utilized to achieve the foregoing steps are not particularly described herein. It will be appreciated, however, that the steps are not required to be performed in the order illustrated.

At step 206, the location of these boundaries, via their respective vertex points and chains, can be stored in order to facilitate an understanding of when regions share common boundaries. At step 208 the boundaries are "smoothed" by known curve fitting techniques. These curve fitting techniques, for example, will cause the chains between vertex points A and B (FIG. 5) to convert in shape from generally straight lines into a contiguous boundary essentially free from abrupt changes therein. Regardless of the ultimate shape of the boundary, it is a feature of this invention that the shape of the boundary is conducive to brush strokes for painting a likeness of the original image.

The present invention may be embodied in other specific forms without departing from its spirit or essential characteristics. Thus, the described embodiments are to be considered in all respects as illustrative only and not restrictive. The particular scope of the invention is indicated by the appended claims rather than by the foregoing description. All changes that come within the meaning and range of equivalency of the claims are to be embraced within their scope.

What is claimed is:

1. A method for changing an original image into a converted image partitioned into small bounded regions corresponding to regions of color in the original image, the steps comprising:

quantizing said original image into a plurality of measurable increments;

absorbing at least one of said measurable increments into another of said measurable increments; and thereafter, assembling said measurable increments into said converted image wherein said converted image comprises regions designated by linear boundaries that are determined primarily by grouping together said measurable increments having similar colors such that said linear boundaries are unrecognizable, by a person unfamiliar with the original image, as a linear representation of said original image.

2. The method according to claim 1, wherein said step of quantizing further comprises the step of digitizing said original image into a plurality of pixels of information, said measurable increments being a scalar value associated with each said pixel of information.

3. The method according to claim 1, further comprising the step of creating a region of said measurable increments, said region having a boundary and containing said at least one of said measurable increments absorbed into said another of said measurable increments.

4. The method according to claim 3, further comprising the step of smoothing said boundary.

5. The method according to claim 1, wherein said step of absorbing said at least one of said measurable increments into said another of said measurable increments further comprises the step of examining said measurable increments adjacent to said at least one of said measurable increments and converting a first value of said at least one of said measurable increments into a second value, said second value being associated with said measurable increments adjacent to said at least one of said measurable increments.

6. The method according to claim 1, further comprising the step of supplying a degree of resolution for said converted image to scale said original image into a desired scale size.

7. The method according to claim 1, further comprising the step of applying reference indicia to said converted image to facilitate correspondence between said original and converted images.

8. The method according to claim 1, wherein said step of assembling said measurable increments into said converted image further comprises the step of assembling a plurality of similar measurable increments into a plurality of regions, said regions forming a template suitable for painting said converted image into a likeness of said original image.

9. The method according to claim 1, further comprising the step of supplying said original image to a scanner in a computing system operating environment to perform said step of quantizing said original image into said measurable increments.

10. A method for changing an original image, said image comprising objects with topological boundaries, into a converted image partitioned into small, irregularly-shaped bounded regions, the steps comprising:

quantizing said original image into a plurality of pixels of information;

determining a value for each pixel of information;

examining a plurality of adjacent pixels of information;

converting a value of a pixel of information into another value; and assembling together pixels of information having similar values into a plurality of regions of said converted image representative of said original image, said regions having linear boundaries that are determined by partitioning said original image into small clusters of color, and wherein said linear boundaries are independent of the topological boundaries of the objects in the original image.

11. The method according to claim 10, further comprising the step of smoothing a boundary between adjacent said regions to substantially eliminate abrupt changes in said boundary.

12. The method according to claim 11, for each region, further comprising the steps of:

i) ascertaining a plurality of vertex points of said region; and ii) connecting said plurality of vertex points together with a plurality of chains to form said boundary.

13. The method according to claim 12, further comprising the step of supplying a degree of resolution of said converted image to scale said original image into a desired scale size.

14. The method according to claim 13, further comprising the step of applying reference indicia to said converted image to facilitate correspondence between said original and converted images.

15. A computer readable medium having computer executable instructions for performing the steps as recited in claim 14.

16. A method for converting a picture into a drawing useful as a template for painting a representation of said picture, the steps comprising:

scaling said picture into a desired scale size;

digitizing said picture into a plurality of pixels of information;

determining a scalar value for each said pixel of information;

based upon said scalar values, examining at least one of said pixels of information, at least one of said pixels of information being a pixel under examination;

determining whether said scalar value of said pixel under examination requires conversion into another scalar value;

if said scalar value of said pixel under examination requires conversion, then determining an appropriate value for said another scalar value;

combining together adjacent said pixels of information having similar said scalar values to form a plurality of regions of said pixels of information;

for each said region,
i) ascertaining a plurality of vertex points of said region; and
ii) connecting said plurality of vertex points together with a plurality of chains to form a boundary of said region;

thereafter, between at least two said regions, smoothing said boundaries to substantially eliminate abrupt changes in said boundary, said boundaries being determined by partitioning said original image into small clusters of color such that said regions are of a size and shape that facilitate the manual painting of said regions when said drawing is reproduced on paper.

17. A computer readable medium having computer executable instructions for performing steps to change an original image into a converted image, the steps comprising:

receiving quantized information regarding said original image, said quantized information comprising a plurality of measurable increments;

comparing adjacent said measurable increments;

based upon said step of comparing, absorbing at least one of said measurable increments into another of said measurable increments;

assembling a plurality of similar said measurable increments into a plurality of regions, said regions having linear boundaries therebetween;

smoothing said boundaries to substantially eliminate abrupt changes in said boundaries, said boundaries serving to distinguish said regions primarily by color; and thereafter, assembling said plurality of regions into said converted image such that said converted image is unrecognizable, by a person unfamiliar with the original image, as a linear representation of said original image.

18. The computer readable medium according to claim 17, further comprising computer executable instructions for performing the step of receiving a degree of resolution of said converted image to scale said original image into a desired scale size.

19. A computer readable medium having computer executable instructions for performing a method for converting a picture, said picture comprising objects with topological boundaries, into a drawing useful as a template for painting a representation of said picture, the steps comprising:

receiving a degree of resolution to scale said photographic picture into a desired scale size;

receiving digitized information regarding said photographic picture, said digitized information comprising a plurality of pixels of information;

determining a scalar value for each said pixel of information;

examining a plurality of adjacent said pixels of information;

based upon said step of examining, converting at least one said scalar value of at least one said pixel of information into another said scalar value;

thereafter, assembling together said pixels of information having similar said scalar values into a plurality of regions of said pixels of information;

for each said region,
  i) ascertaining a plurality of vertex points of said region; and
  ii) connecting said plurality of vertex points together with a plurality of chains to form a boundary of said region;

thereafter, between at least two said regions, smoothing said boundaries to substantially eliminate abrupt changes in said boundary to create regions distinguished primarily by color, said boundaries contributing to said template and being so sized and shaped to facilitate painting thereof;

applying reference indicia to said boundaries to facilitate correspondence between said photographic picture and said drawing; and supplying an output of said drawing, wherein said drawing is independent of the topological boundaries of the objects in said picture such that said drawing is substantially unrecognizable, by a person unfamiliar with the original image, as a linear representation of said picture.

20. The computer readable medium according to claim 17, further comprising computer executable instructions for performing, for each region, the steps of:

i) ascertaining a plurality of vertex points of said region; and
  ii) connecting said plurality of vertex points together with a plurality of chains to form said boundary.

21. The computer readable medium according to claim 17, further comprising computer executable instructions for performing the step of applying reference indicia to said converted image to facilitate correspondence between said original and converted images.

* * * * *